United States Patent [19]

Mussler et al.

[11] Patent Number: 5,580,584
[45] Date of Patent: Dec. 3, 1996

[54] INJECTION MOLDING MACHINE

[75] Inventors: Richard Müssler, Steinbrunn; Harald Bleier, Neustadt, both of Austria

[73] Assignee: Battenfeld Kunststoffmaschinen Ges.m.b.H., Kottingbrunn, Austria

[21] Appl. No.: 320,709

[22] Filed: Oct. 7, 1994

[30] Foreign Application Priority Data

Oct. 7, 1993 [DE] Germany .......................... 43 34 134.9

[51] Int. Cl.⁶ .................................................. B29C 45/78
[52] U.S. Cl. ........................... 425/143; 264/40.7; 425/145; 425/150
[58] Field of Search ...................................... 425/149, 150, 425/145, 143; 264/40.7

[56] References Cited

U.S. PATENT DOCUMENTS 5,417,558  5/1995  Heindel et al. ..................... 425/150

*Primary Examiner*—Tim Heitbrink
*Attorney, Agent, or Firm*—Anderson Kill Olick & Oshinsky, P.C.

[57] ABSTRACT

An injection molding machine which includes an injection molding unit, a plurality of electrical servomotors for driving components of the injection molding unit, and a plurality of power and control units corresponding to the plurality of electrical servomotors for operating same, with each of the plurality of power and control units being provided with a cooling system including at least one cooling loop.

6 Claims, 2 Drawing Sheets

INJECTION MOLDING MACHINE

BACKGROUND OF THE INVENTION

The present invention relates to an injection molding machine including at least an injection molding unit having a plurality of actuating electrical servomotors.

The injection molding units of this type have a modular structure formed of a plurality of structural subunits. An injection molding unit of this type is disclosed in German Publication P42 20 445.3. The injection molding unit disclosed in P42 20 445.3 includes the following subunits:

a first subunit that consists of a plastifying block formed of an extrusion cylinder and a screw rotatably supported therein;

a second subunit that consists of a metering drive for the screw of the plastifying block;

a third subunit that consists of two parallel drives for effecting displacement of an injection nozzle of the plastifying block between the plastifying block and a mold; and a fourth subunit that consists likewise of two parallel drives for effecting injection displacement of the screw of the plastifying unit in the extrusion cylinder, that is, for effecting axial displacement of the screw.

In the injection molding unit of German Publication P42 20 445.3, the plastifying block is located between the pairs of drives forming the third and fourth subunits.

In order to reduce the energy costs associated with driving different components of the injection molding unit and to provide a compact structure, at least the drive pair forming the fourth subunit is formed of electrical servomotors provided with forced cooling, in particular, liquid cooling, with the two electrical servomotors being connected for synchronous operation. Also, advantageously, in addition to the electrical servomotors forming the fourth subunit, the drives of the second and third subunits are also formed of liquid-cooled electrical servomotors.

The use of liquid-cooled electrical servomotors in the injection molding unit of German Publication P42 20 445.3 insures precise running of displacement steps and, therefore, of the injection process. As a result, the quality of the produced workpieces can be substantially increased. Furthermore, the total costs associated with the manufacturing of an injection molding machine are substantially reduced. Also, separate electrical servomotors can directly be fed from the available electrical main.

However, of particular importance is providing with liquid-cooled electrical servomotors, the components for injection molding machines, which are to be operated under "clean room" conditions. The heat energy, which is carried away by the cooling medium from the region of a drive, has no effect on the "clean room" conditions. The heat energy, which is carried away, can subsequently be reused, e.g., for tempering the mold and/or the heating bands of the extrusion cylinder of the injection molding unit. As a result, the overall efficiency of the injection molding machine is substantially increased, while the energy costs, associated with the operation of the injection molding machine, are reduced.

When three-phase electromotors are used as liquid-cooled electrical servomotors, the drive system of the injection molding unit includes, as a rule, power and control electronics or electronic units for each of the three-phase servomotors. Such power and control units may be formed as a semiconductor convertor having a modular structure, formed of one or several power and control units connected by an intermediate circuit to a base unit. In such a modular structure, the intermediate circuit is connected to an electrical main through a transformer and an input rectifier.

A power and control unit provides for a rotary field with variable frequency, amplitude and phase position, dependent on the rotational speed and the load of a respective electrical servomotor. Naturally, with the use of such power and control units, not insignificant energy losses occur, which are converted, in an undesirable way, into heat energy. As a result, when such power and control units are used in an injection molding machine, they may adversely effect the "clean room" conditions as well as reduce the total efficiency of the injection molding machine.

Accordingly, an object of the invention is to provide an injection molding machine of the type, which is described above, in which the above-discussed drawbacks, associated with the use of the power and control electronic units, are eliminated.

SUMMARY OF INVENTION

This and other objects of the invention, which will become apparent hereinafter, are achieved by providing power and control units, with each unit being provided with a liquid-cooling system having at least one cooling loop. Advantageously, each liquid cooling system is formed of a cooling plate containing the cooling loop.

It is especially advantageous when the liquid cooling systems or cooling plate of several power and control units are connected to a common main liquid cooling system. The common liquid cooling system can likewise be formed of a cooling plate containing at least one cooling loop with several parallel connection units for being respectively connected with separate liquid cooling systems of separate power and control units.

Because the liquid cooling systems of separate power and control units may form, together with the common cooling system, a closed cooling circuit with heat sink elements, e.g., tempering devices for molds and/or the extrusion cylinder of the injection molding unit, the heat energy, which is carried away from the power and control units, is also reused. As a result, the total efficiency of the injection molding machine is further increased and the energy costs are further reduced.

The advantage of providing power and control units having liquid cooling systems consist in that the need for providing ventilation for forced cooling, which is required with the use of conventional power and control units, is eliminated. This elimination of the need in forced ventilation not only reduces the overall dimensions of an injection molding machine and manufacturing costs, but also facilitates its operation under "clean room" conditions. This is because no ducts or conduits for conducting air are required. Also, the temperature variations during different seasons or in different climate zones can be more easily compensated, and trouble-shooting is substantially simplified.

Also, the power utilization of different electrical components is increased, and maintaining constant relationships permits to reduce the dimension reserves for different equipment. Finally, the power and control units can be mounted in an injection molding machine anywhere where the required space is available. This is because a free space for inlet and outlet of air ducts is not required anymore when liquid cooling systems are used.

It should be pointed out, of course, that the use of power and control servo-units with liquid cooling systems is not limited to servodrives of the injection molding unit of an injection molding machine. Such power and control units can also be used for clamping units of the injection molding machines, which have liquid-cooled electrical motors as drives. Such clamping unit is disclosed in, e.g., German Publication P42 28 139.3-16.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
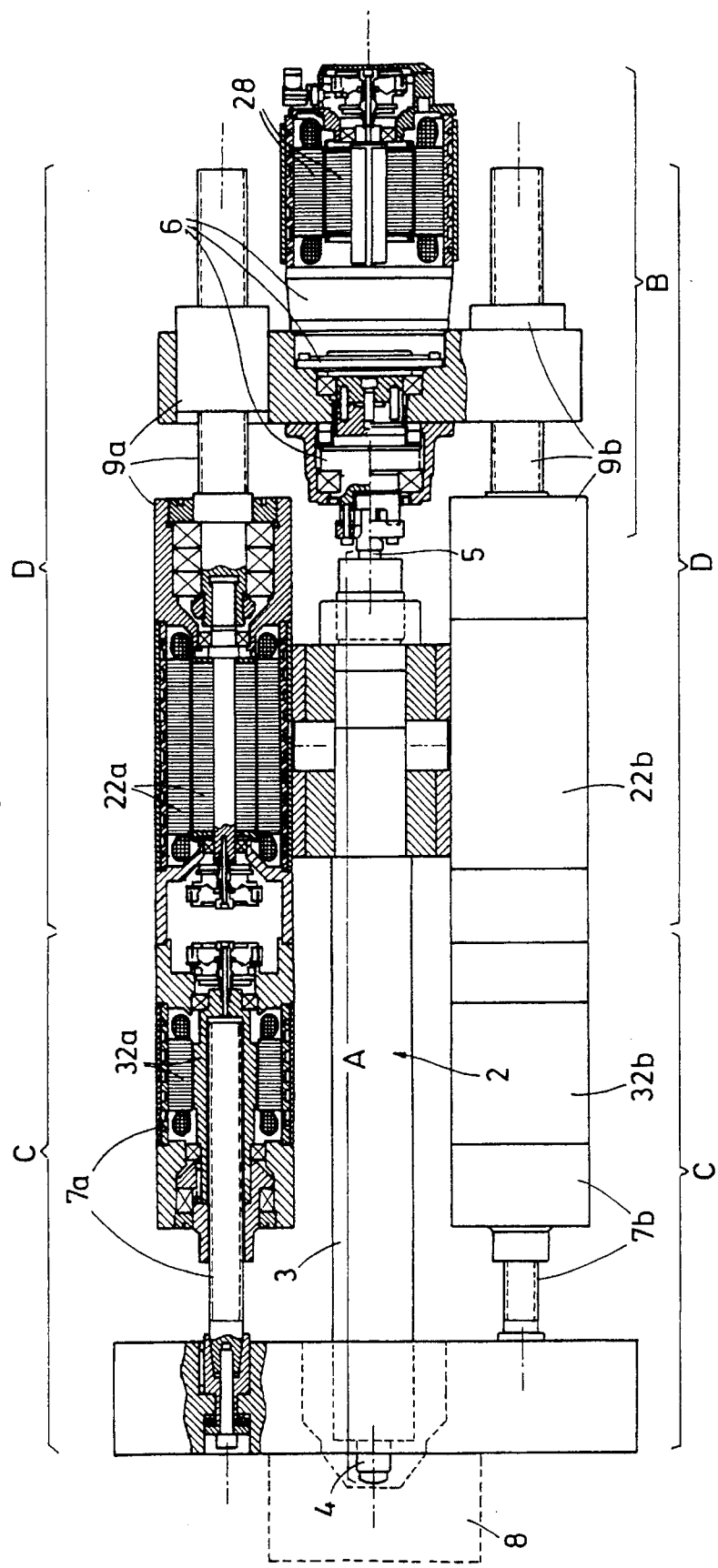
FIG. 1 shows a partially cross-sectional plan view of an injection molding unit for an injection molding machine according to the present invention.

FIG. 1 of the drawings shows a simplified view of an injection molding machine, in which primarily the injection molding unit of the machine is shown. The injection molding unit shown in FIG. 1 has a modular structure.

Another important component of an injection molding machine, namely, the clamping unit for the mold which cooperates with the injection molding unit, is not shown in FIG. 1, though it will be referred to in the following description.

The injection molding unit shown in FIG. 1 consists of structural subunits A, B, C and D wherein the subunit A is a plastifying block 2 of the injection unit. The plastifying block 2 includes an extrusion cylinder 3 with an injection nozzle 4 at the front portion of the cylinder, and a screw 5 which is rotatably supported inside the cylinder 3 and projects out of the rear portion of the cylinder 3. The extrusion cylinder 3 is, at least along a portion of its length, wrapped up with so-called heating and cooling bands.

The second subunit B is formed by a metering drive 6 for the screw 5, with the metering drive 6 being connected to the end of the screw 5 that projects out of the extrusion cylinder The third subunit C is formed by two parallel, identical drives 7a and 7b, located one beneath the other, which provide for movement of the injection nozzle 4 which is fed with plastic melt from the plastifying block 2, relative to the injection molding die 8, shown in FIG. 1 only by dash lines.

The fourth subunit D is also formed by two parallel drives 9a and 9b for effecting axial displacement of the screw 5 in the extrusion cylinder 3 of the plastifying unit 2. The axial displacement of the screw 5 determines the injection movement of the screw 5.

As shown in FIG. 1, it is not only the subunit B-forming metering drive 6 for the screw 5 of the plastifying block 2 is equipped with a servomotor 28. The drives 7a and 7b and the drives 9a and 9b are likewise equipped with electrical servomotors 32a, 32b and 22a, 22b, respectively. Altogether, the injection unit I has, thus, five servomotors 28, 32a and 32b, and 22a and 22b.

It is important to point out that the electrical servomotors 28, 32a and 32b, and 22a and 22b, which form the drive system of the injection unit 1, are liquid-cooled electrical servomotors and primarily, three-phase synchronous electromotors with a high power density. The use of such electromotors enables not only to provide a compact drive assembly, but also permits to increase the overall efficiency of the injection molding machine, while reducing the energy costs, and to operate the injection molding machine without major problems under "clean room" conditions.

The heat energy which is accumulated by the cooling liquid medium can be used, for example, for tempering the heating bands of the extrusion cylinder and/or for tempering the components of the clamping unit. The operation under "clean room" conditions is possible because the cooling of the electrical servomotors with water is not accompanied by any undesirable air turbulence.

Figure 2:
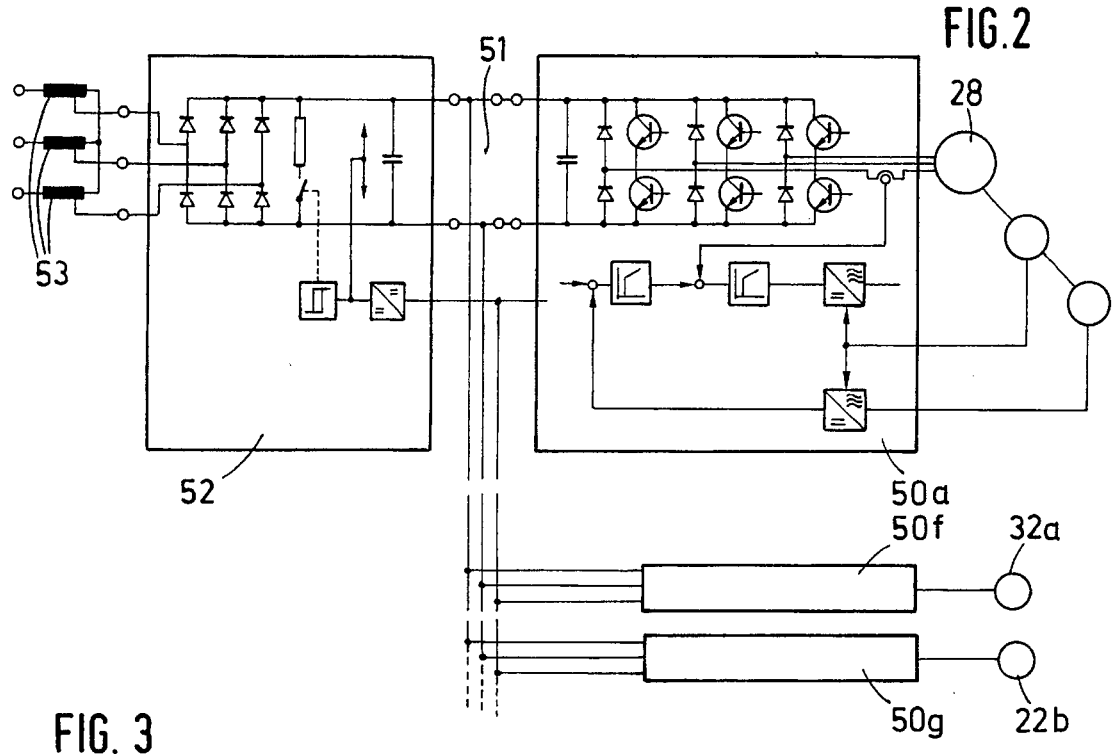
FIG. 2 shows a principle diagram of a power and control unit for controlling operations of servomotors for actuating an injection molding unit or a clamping unit of an injection molding machine.

For an optimal operation of three-phase, synchronous, liquid-cooled electrical servomotors, as a rule, so-called power and control units are used, the principle diagram of which is shown in FIG. 2 of the drawings.

The power and control unit comprises at least one servounit 50a. However, as a rule, several servounits 50a, 50b ... 50f, 50g, are used simultaneously. The units 50a, 50b... 50f and 50g are connected by a so-called intermediate circuit 51 to a base unit 52, which is connected to a three-phase main circuit by an intermediate transformer.

The intermediate circuit 51 is charged from the main circuit via the transformer 53 and the input rectifier of the base unit 52. Dependent on the rotational speed and the load, a rotary field with variable frequency, amplitude and phase position will be generated in each of the servounits 50a, 50b ... 50f and 50g in accordance with the conversion principle for a respective associated three-phase synchronous electromotor, in order to operate the respective electromotors in accordance with the required either the phase relationship or co-current flow shunt characteristics.

Each of the power and control units, because they are equipped with power semiconductors (diodes, transistors), should be adequately cooled so that considerable conversion would not take place in the pn-layer due to heating. The heating of a semiconductor leads to an increase in current flow so that in a short while the layer is heated above an allowable limit. When this occurs, the semiconductor loses its blocking capability and the current will flow in both directions. Therefore, it is important that the heat is conducted away from the semiconductor plates as soon as possible.

Figure 3:
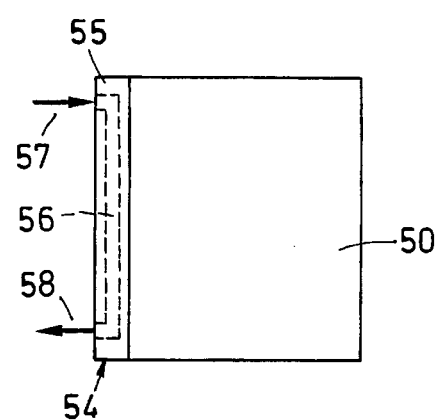
FIG. 3 shows a schematic side view of a power and control unit according to the invention.
Figure 4:
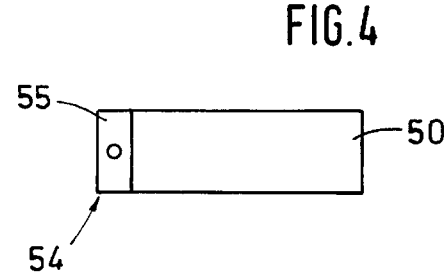
FIG. 4 shows a plan view of the power and control unit shown in FIG. 3.

FIGS. 3 and 4 show schematically a power and control unit 50 which comprises a liquid cooling system 54 according to the present invention. The liquid cooling system is formed, preferably, of a cooling plate 55 made of a good heat-conducting material, for example, copper, and having a cooling loop 56 extending from a liquid inlet 57 to a liquid outlet 58. The layout of the loop 56 is so selected that an optimal heat carrying-off is insured.

Figure 5:
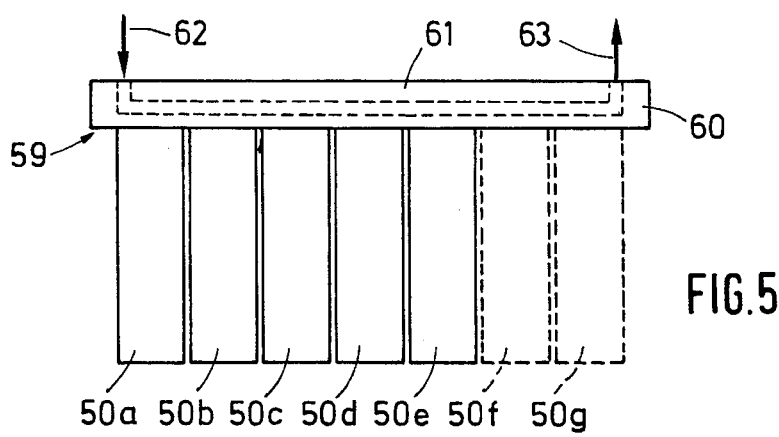
FIG. 5 shows a schematic side view of another embodiment of a power and control unit according to the present invention in modular implementation.

FIG. 5 shows a modular arrangement of power and control units 50a–50g. In the modular arrangement shown in FIG. 5, the liquid cooling system 59 is used for cooling a plurality of servounits 50a, 50b, 50c, 50d and 50e. In the embodiment of FIG. 5, the cooling system 59 has two additional connection positions with which, if needed, two additional power and control units 50f and 50g can be connected.

As in the embodiment of FIGS. 3–4, the liquid cooling system shown in FIG. 5 comprises a cooling plate 60 having at least one cooling loop 61 with a liquid inlet 62 and a liquid outlet 63. The cooling loop 61 is provided, along the cooling plate 60, with a plurality of connection units, of which each is adapted to be connected with the inlet 57 and the outlet 58 of the cooling loop 56 of the cooling plate 55 of each of servounits 50a–50e.

The main liquid cooling system 59, according to FIG. 5, may advantageously be formed as a closed liquid loop with a heat sink associated with the injection molding machine. As a heat sink, the heating bands of the extrusion cylinder 3 of the injection molding unit I can be used. Also, the tempering device for the clamping unit of the injection mold 8 of the injection molding machine can be used.

It is important in each case that the heat losses are carried-off from the power and control unit 50 as quickly as possible, and as reliably as possible. As a result, an overall efficiency of an injection molding machine will be increased and energy consumption and, therefore, costs will be reduced. Also, the use of a liquid-cooling system facilitates the operation of the power and control units of an injection molding machine under "clean room" conditions as, with the liquid-cooling, no undesirable air turbulence takes place.

The liquid-cooling systems for the electrical servomotors of an injection molding machine can cooperate with the liquid-cooling systems for the power and control units, e.g., through a main liquid-cooling system 59 of FIG. 5. It is, of course, possible to use the liquid-cooling systems for the power and control units, even if the electrical servomotors of an injection molding machine are provided, with other cooling medium systems such as air-cooling systems.

With the use of liquid-cooling systems according to the present invention, it is possible to control the amount of the cooling medium, which flows through the cooling loop, and to control the temperature difference of the cooling liquid at the inlet and the outlet with appropriate control means. The measuring parameters can be used for evaluation of the operational conditions of separate components of an injection molding unit as well as of the injection molding machine itself, for example, reliable switching off can be achieved if overload occurs. Also, changes in operational conditions may be monitored, e.g., an electrical motor with defective bearings requires more power for the same operation and, as a result, the temperature of the cooling medium increases. This permits to provide evaluation means that would reliably turn off the motor when the predetermined temperature level is exceeded.

Though the present invention was shown and described with reference to preferred embodiments, various modifications thereof will be apparent to those skilled in the art and, therefore, it is not intended that the invention be limited to the disclosed embodiment and/or details thereof, and departures may be made therefrom within the spirit and scope of the appended claims.

What is claimed is:

1. An injection molding machine, comprising:

an injection molding unit;

a plurality of electrical servomotors for driving components of the injection molding unit; and a plurality of power and control units corresponding to the plurality of electrical servomotors for operating the electrical servomotors, wherein each of the plurality of power and control units is equipped with a liquid-cooling systems independent of a cooling system of a respective electrical servomotor and having at least one cooling loop.

2. An injection molding machine as set forth in claim 1, wherein said liquid-cooling system comprises a cooling plate in which the at least one cooling loop is formed.

3. An injection molding machine as set forth in claim 1, comprising a common liquid-cooling system connected with separate cooling systems of power and control units of the plurality of power and control units.

4. An injection molding machine as set forth in claim 3, wherein the common liquid-cooling system comprises a cooling plate having at least one cooling loop having a plurality of parallel connection units for connection with the separate liquid-cooling systems of the power and control units.

5. An injection molding unit as set forth in claim 4, wherein the at least one cooling loop in the cooling plate of the common liquid-cooling system is formed as a closed liquid loop with a heat sink associated with a tempering device of at least one of an injection mold of the injection molding machine, and heating bands of an extrusion cylinder of the injection molding unit.

6. An injection molding machine as set forth in claim 1, wherein each of the plurality of the electrical servomotors is associated with a liquid-cooling system.

* * * * *